(12) United States Patent (10) Patent No.: US 8,341,514 B2
Westerinen et al. (45) Date of Patent: Dec. 25, 2012

(54) USING STATIC DATA IN A MARKUP LANGUAGE

(75) Inventors: Andrea Westerinen, Issaquah, WA (US); Marco Chierotti, Redmond, WA (US); Kevin Grealish, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1083 days.

(21) Appl. No.: 11/669,881

(22) Filed: Jan. 31, 2007

(65) Prior Publication Data

US 2008/0183736 A1 Jul. 31, 2008

(51) Int. Cl.
*G06F 17/00* (2006.01)
(52) U.S. Cl. ............... 715/234; 707/803; 707/999.102; 707/999.103; 715/205; 715/276
(58) Field of Classification Search .............. 715/200, 715/205, 234, 237, 239, 242, 276; 707/999.1, 707/999.102, 999.103, 803; 709/223–224; 705/1
See application file for complete search history.

(56) References Cited

U.S. PATENT DOCUMENTS

| 7,373,595 | B2 * | 5/2008 | Jones et al. | 715/234 |
| 2004/0006744 | A1 * | 1/2004 | Jones et al. | 715/514 |

OTHER PUBLICATIONS

Walmsley P.,"Definitive XML Schema," © Dec. 7, 2001, Prentice Hall, pp. 96-117, 141-152, and 300-340, 90 pages total.*
Damodaran, S.,"B2B Integration over the Internet with XML—RosettaNet Successes and Challenges," WWW2004, May 16-May 22, 2004, New York, New York, ACM, pp. 188-195.*
Walmsley, P.,"Definitive XML Schema," published Dec. 7, 2001, pp. 17-34; covering Chapter 2 (pages renumbered 1-24 of 24), 24 total pages.*

* cited by examiner

*Primary Examiner* — Cesar Paula
*Assistant Examiner* — James H Blackwell
(74) *Attorney, Agent, or Firm* — Lee & Hayes, PLLC

(57) ABSTRACT

Described herein are techniques for specifying and utilizing static data in the environment of a tag-based or meta-markup document description language such as XML.

11 Claims, 5 Drawing Sheets

USING STATIC DATA IN A MARKUP LANGUAGE

BACKGROUND

Extensible Markup Language XML is a file format for representing data and a schema for describing data structure. XML is a simplified subset of the Standardized Generalized Markup Language (SGML). Generally, XML can be referred to as a meta-language: a language for describing languages. It allows programmers to define their own structures for data representation, using extensible tag-based elements. XML also falls under the category of markup or meta-markup languages, and is sometimes referred to as a document description language.

XML provides a uniform method for exchanging data in an open, text-based format. A wide variety of applications use XML to share data.

XML utilizes the concepts of elements and namespaces to define tree structures or hierarchies of data. The general syntax of XML and similar languages is rigid: adherence to the standardized format or syntax assures that XML-aware software can at least read and understand the relative arrangement of information within a given data structure.

XML "elements" are structural constructs that consist of a start tag, an end or close tag, and information or content contained between or within the tags. A start tag is formatted as <tagname> and an end tag is formatted as </tagname>. In an XML document, start and end tags can be nested within other start and end tags. Each element forms a node in this tree structure, and potentially has child or branch nodes. The child nodes represent any XML elements that occur between the start and end tags of the parent node.

Generally, data is contained in a document referred to as an XML document. The structure of the data is defined by an XML schema or schema document (or similar structure in other markup or tag-based languages). An XML schema includes legal building blocks of the XML document: element declarations, child elements, attributes, data types, whether the elements are empty or include any text, default and fixed values for elements and attributes, and so on. For example, standard data types such as strings, dates, date times, durations, time zones, decimals, numerics, integers, etc, may be used in an XML schema within new type declarations.

XML supports various "off-the-shelf" data types, and further data types are defined by the programmer in the XML schema. To use a data type, an element of that type is declared in the XML document and then instantiated. Instantiations of elements of given data types can be assigned values when created, and may subsequently be updated or removed.

SUMMARY

This summary is provided as a convenience to the reader, and is not intended to identify essential features of the subject matter or to limit the scope of the claims.

Described below are techniques for utilizing static data within XML documents. In one implementation, such static data is embedded within a type definition. Elements and instances based on that type definition are inherently associated with the static data specified within the type definition.

BRIEF DESCRIPTION OF THE DRAWINGS

The detailed description is described with reference to the accompanying figures. In the figures, the left most digit(s) of a reference number identifies the figure in which the reference number first appears. The same numbers are used throughout the drawings to reference like features and components.

DETAILED DESCRIPTION

Figure 1:
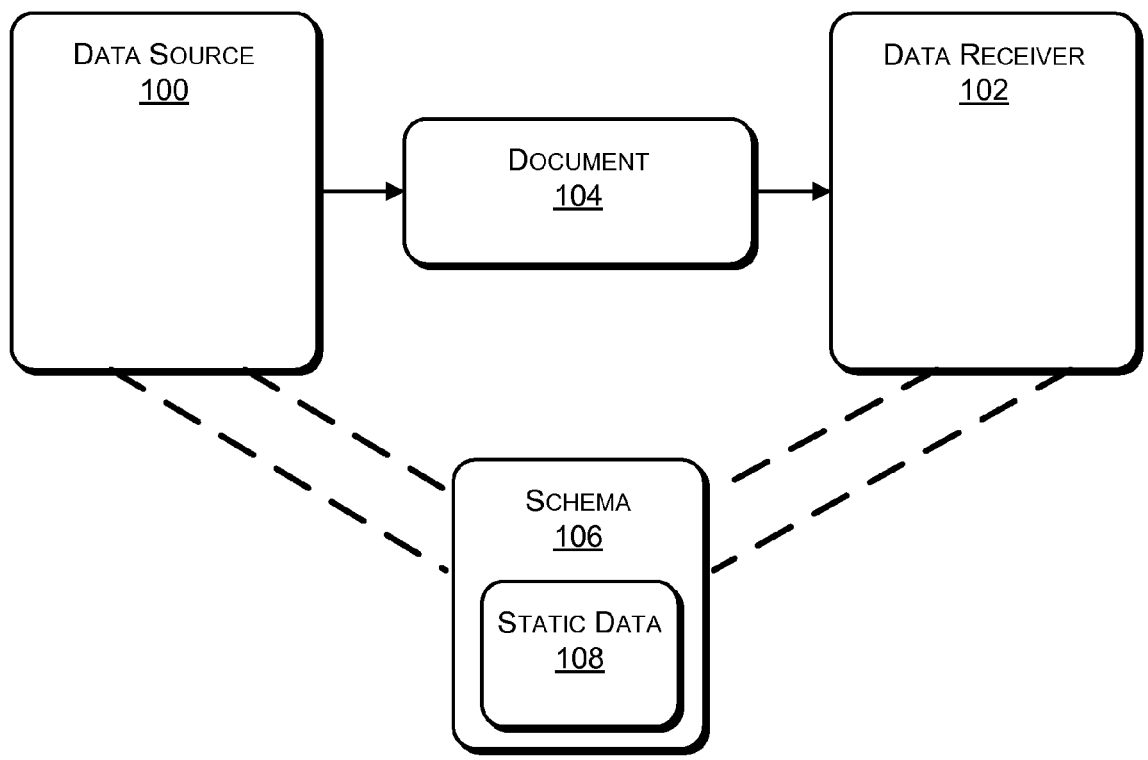
FIG. 1 illustrates a situation in which data might be exchanged, and in which static data might be utilized in conjunction with XML.

FIG. 1 illustrates a typical scenario in which data might be exchanged using a meta-language, markup language, meta-markup language or tag-based language, which in this instance will be described in the context of the XML standard. Note, however, that the same techniques can be implemented in other languages.

In this scenario, a data source 100 provides data to a data receiver 102. The data is embedded in an XML document 104. XML document 104 is formatted in accordance with standardized XML syntax, and also conforms to a custom XML schema 106. Data receiver 102 parses and interprets the data with reference to schema 106.

When using XML, the inventors have found that it is sometimes desirable to define static data, so that every instance of an element of a particular type includes or is associated with the same static data. In the example of FIG. 1, such static data is specified within schema 106. Specifically, one or more type declarations within schema 106 can include one or more static data elements, identified by a previously agreed upon tag or identifier, that specify static information or data. Such static data is represented in FIG. 1 by block 108, within schema 106.

Data receiver 102 receives XML document 104 and while parsing and interpreting the document may encounter one or more instances of elements that are defined elsewhere—such as elsewhere in XML document 104 or in schema 106. In these situations, data receiver 102 may refer to schema 106 to identify whether the document elements are defined or otherwise specified within schema 106. If data receiver 102 finds that the elements are not defined or otherwise specified in schema 106, data receiver 102 may show an error. If the document element is found in schema 106, however, data receiver 102 uses information obtained from the schema document while parsing or interpreting the document instance. In particular, whenever data receiver 102 encounters an instance of an element in document 104 of a type for which static data has been specified, the static data is obtained from schema 106.

Figure 2:
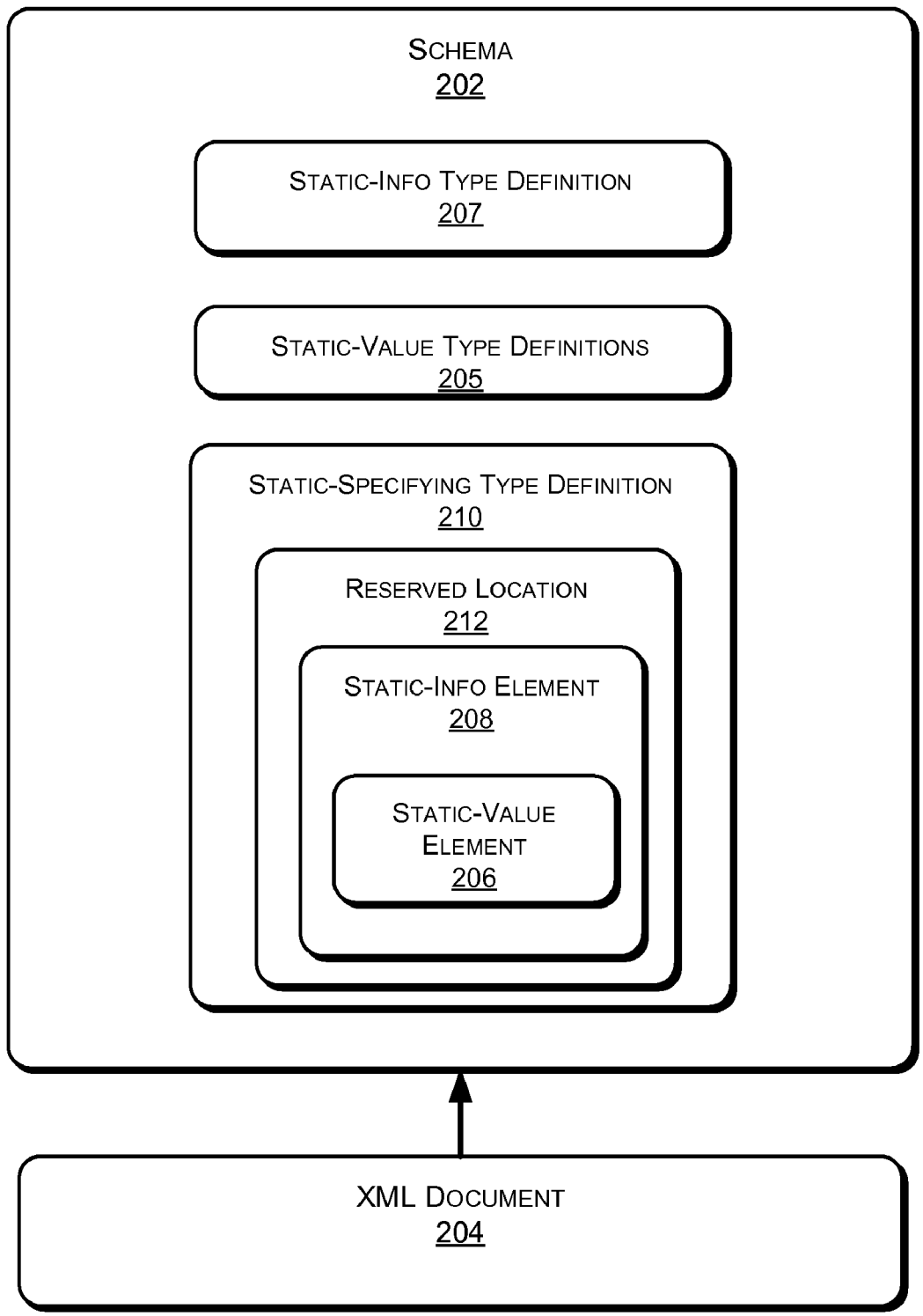
FIG. 2 illustrates components of an XML schema and a related XML document, formatted to specify and utilize static data.

FIG. 2 illustrates components of an XML schema 202 and an XML document 204 that is based on XML schema 202. Using the techniques described below, static data is embedded in type definitions of XML schema 202. When elements are instantiated in document 204 based on such type definitions, the embedded static data is inherently associated with those instances and can be obtained by referencing XML schema 202.

In the described implementation, static data values are instantiated elements based on pre-defined types. For clarity in the following discussion, such pre-defined types will be referred to as "static-value" types, definitions of which are represented in FIG. 2 by block 205. Elements based on these types will be referred to as "static-value" elements. Note that static-value types might be defined in XML schema 202 or in another schema, and in many cases might be some type of pre-existing data type that was not necessarily designed for the purpose of representing static data.

For purposes of discussion, the following examples will use a static-value type named File, which is intended to represent data specifying characteristics of a computer file. Assume that the File data type is defined within static-value type definitions 205 to include sub-elements "FileName" and "Path". Based on the File data type definition, XML schema 202 might have an XML structure that specifies file-related static data as an instance 206 of a static-value element of the File data type. The actual text of such an example is as follows:

```
1. <core:StaticInfo infoIdentifier="MyFileID">
2.   <core:File>
3.     <core:FileName>myfile.txt</core:FileName>
4.     <core:Path>\mypath</core:Path>
5.   </core:File>
6. </core:StaticInfo>
```

The line numbers in the listings above and below are for reference purposes only: the actual XML statements of interest follow the line numbers.

In the example above, the first line consists of an opening XML tag with a pre-defined identifier "StaticInfo", which has been previously defined and agreed upon to indicate static data. Specifically, schema 202 includes a Static-Info type definition 207 that defines the StaticInfo type. In FIG. 2, an instance of the static-Info type is represented as block 208.

Static-Info type 207 can be defined in schema 202 as shown, or in a different schema. The preceding identifier "core" designates a namespace in which the StaticInfo type has been defined. The core namespace will be used throughout the rest of the examples for purposes of illustration. As noted, however, multiple namespaces are permitted, and the Static-Info definition need not occur in the same namespace as its instantiation.

The opening tag of line 1 includes an attribute "infoIdentifier". This is an attribute of the StaticInfo type that identifies this instance of StaticInfo. In this example, "infoIdentifier" is assigned a value of "MyFileID".

Lines 2 through 5 specify instances 206 of one or more previously declared elements of a static-value type 205, along with corresponding values. These instances of elements comprise static data that will be associated with instances in XML document 204. In this example, these lines specify an instance of the File data type as discussed above, including sub-elements FileName and Path.

Any number of elements can be instantiated and initialized within the StaticInfo tags. The resulting structure is validateable because the embedded elements have been declared elsewhere (either in the same or a different schema).

In another embodiment, the StaticInfo type includes further attributes relating to the static data:

```
1. <core:StaticInfo infoIdentifier="MyFileID" propagate="true"
2.     allowOverride="false">
3.   <core:File>
4.     <core:FileName>myfile.txt</core:FileName>
5.     <core:Path>\mypath</core:Path>
6.   </core:File>
7. </core:StaticInfo>
```

In this example, the StaticInfo type includes attributes named "propagate" and "allowOverride", both of which can be set to either true or false. The propagate attribute specifies whether or not the specified static data is propagated down the XML typing hierarchy. The allowOverride attribute specifies whether or not the static data can be overridden in a subtype. Further, if the propagate attribute is true and allowOverride is false, then instances of elements of the StaticInfo type possessing the same infoIdentifier are not permitted.

When specifying static data to be associated with a particular XML data type, the StaticInfo element is placed within and associated with the type definition of that data type. An example of such a type definition is illustrated in FIG. 2 by block 210, which contains the instance of StaticInfo element 208. For purposes of further discussion, a data type that specifies or is associated with static data will be referred to as a "static-specifying" data type.

Within static-specifying type definition 210, StaticInfo element 208 can be located in a well-known or standardized location. For example, the StaticInfo element 208 can be placed in an area of static-specifying type definition 210 that is normally reserved for documentation of the type definition. Such a reserved location is indicated in FIG. 2 by block 212. In the described implementation, reserved location 212 corresponds to the appInfo and annotation elements of static-specifying type definition 210, as follows:

```
1.  <xs:annotation>
2.    <xs:appinfo>
3.      <core:StaticInfo infoIdentifier="MyFileID"
         propagate="true" allowOverride="false">
4.        <core:File>
5.          <core:FileName>myfile.txt</core:ElementName>
6.          <core:Path>\mypath</core:Path>
7.        </core:File>
8.      </core:StaticInfo>
9.    </xs:appinfo>
10. </xs:annotation>
```

Where "xs:" refers to the standard XML Schema Document namespace (see http://www.w3.org/2001/XMLSchema), where the annotation and appinfo elements are defined.

The annotation and appinfo elements are standard, optional elements of static-specifying type definition 210, normally used for application-level documentation of XML code.

As illustrated above, static data can be specified by creating instances of the StaticInfo element within a static-specifying type definition. The static data itself is embedded within the StaticInfo element by creating instances of previously defined XML elements. Multiple instances of elements of the StaticInfo type may be declared within the annotation and appinfo tags. Each of these elements is labeled using the infoIdentifier attribute.

The StaticInfo type itself is defined in a definition 207 of XML schema 202 or another schema to include the attributes described above, along with default values for those attributes. "Lax" processing is specified in order to skip validation of instances of XML elements whose schemas cannot be located. This could be modified to be "strict" or "skip" processing depending on whether or not explicit validation of the static data instances should be performed.

The following is one way in which the StaticInfo type might be defined:

```
1.   <xs:complexType name="StaticInfoType">
2.     <xs:sequence>
3.       <xs:any namespace="##any" processContents="lax"
              minOccurs="0" maxOccurs="unbounded"/>
4.     </xs:sequence>
5.     <xs:attribute name="infoIdentifier" type="xs:string"
              use="required"/>
6.     <xs:attribute name="propagate" type="xs:boolean"
              default="true">
7.     </xs:attribute>
8.     <xs:attribute name="allowOverride" type="xs:boolean"
              default="true">
9.     </xs:attribute>
10.  </xs:complexType>
11.  <xs:element name="StaticInfo"
              type="tns:StaticInfoType">
12.  </xs:element>
```

Where "tns" refers to the target name space (i.e., the current namespace where StaticInfoType is defined).

Elements may be declared and instantiated within XML document 204 based on static-specifying type definition 210. Each such instance is inherently associated with the static data specified within the corresponding static-specifying type definition 210. Thus, the static data is not required to be enumerated with each instance of the data type. When parsing or otherwise consuming XML document 204, the static data is obtained by referencing XML schema 202.

The following is an example of a complete type declaration using the described techniques for embedding static data. Suppose the "ABC Company" wants to specify an explicit, non-overridable JPEG (graphics file) for its special computer system chassis (the "Special1 Chassis"). They sub-type the general ChassisType XML declaration to create a Special1ChassisType and add a static File instance to define where the JPEG image is located. Note that the File element and type are defined in this or another XML schema. (If in another schema and that schema is imported, then the File instance can be validated by the infrastructure.)

The JPEG file information is unchanging for each instance of Special1ChassisType—and is easy to retrieve by an application. The user/developer simply retrieves the XML Schema. This technique reuses a known, validate-able element declaration (File) and places that declaration in a well-defined location in the declaration of Special1ChassisType (within the annotation and appinfo elements).

The XML for the ABC Company's Special1 chassis would be as follows:

```
1.   <xs:complexType name="Special1ChassisType">
2.     <xs:annotation>
3.       <xs:appinfo>
4.         <core:StaticInfo infoIdentifier="Special1 JPG
              Chassis Image" propagate="true"
              allowOverride="false">
5.           <core:File>
6.             <core:FileName>
7.               special1.jpg
8.             </core:FileName>
9.             <core:Description>
10.              JPEG file for Special1 Chassis
11.            </core:Description>
```

-continued

```
12.            <core:Path>\chassis\jpegs</core:Path>
13.            <core:FileSpecificReferences>
14.              <core:FileSystemRef
                 uri="ftp://www.abccompany.com"/>
15.            </core:FileSpecificReferences>
16.          </core:File>
17.        </core:StaticInfo>
18.      </xs:appinfo>
19.    </xs:annotation>
20.    <xs:complexContent>
21.      <xs:extension base="core:ChassisType">
22.        <xs:sequence/>
23.      </xs:extension>
24.    </xs:complexContent>
25.  </xs:complexType>
```

The data within the StaticInfo delimiter apply to all instances of the type that includes this delimiter; hence, the data is not repeated in the definitions of such instances. The data is easily understood and retrieved by an application or user from the XML Schema definition itself.

Figure 3:
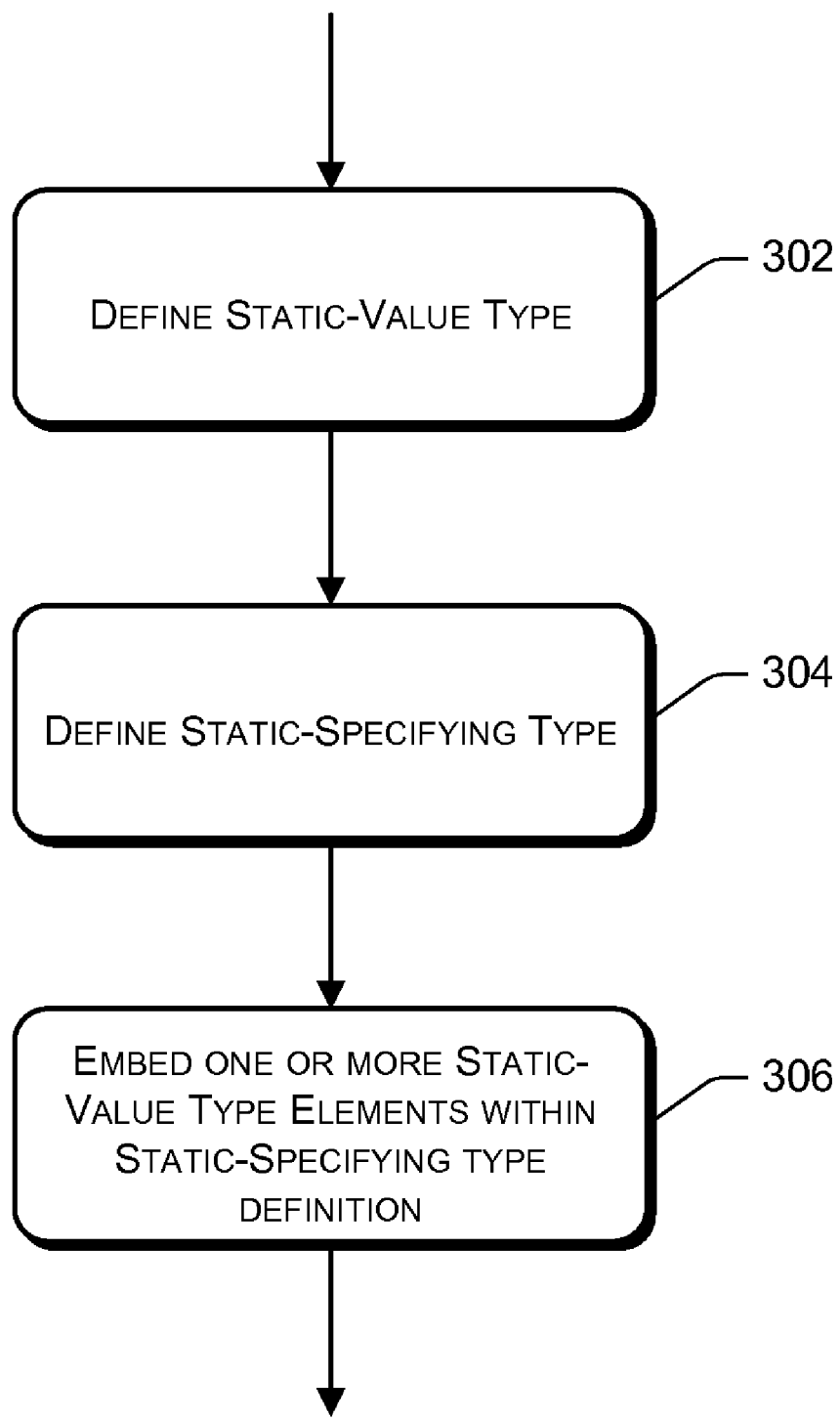
FIG. 3 illustrates an exemplary method for defining static data in an the XML environment of FIG. 2

FIG. 3 illustrates the described techniques in the form of a flowchart. The steps or actions shown in FIG. 3 perform a method of associating static data with one or more XML elements of a desired data type—also referred to herein as a static-specifying data type. These steps or actions will be described with reference to the components of FIG. 2.

An action 302 comprises defining or pre-defining a static-value data type. A static-value type definition, shown in FIG. 2 as block 205, is a conventional data type definition defining characteristics of an element that may or may not be routinely used to represent static data. More specifically, an element of this data type can be instantiated within another data type definition to represent static data.

An action 304 comprises defining a desired data type with a static-specifying data type definition, represented in FIG. 2 as block 210. As will be described, such a static-specifying type definition includes static data that will be inherently associated with any elements based on that static-specifying type definition.

Action 306 comprises embedding one or more instances of elements of pre-defined, static-value data types as defined within block 302 within the Static-Info tags of the static-specifying type definition of block 304. The static-value types might comprise standard data types, or other data types that have been defined in the same or a different schema.

The instances of XML static-value data types include static data values, which are intended to be used as static data by components that utilize elements of the data type indicated by the static-specifying type definition 210.

In the described implementation, action 306 includes placing the instances of the static-value data types in a standardized location within static-specifying type definition 210. In particular, static-value elements 206 are located within the annotation and appinfo, and StaticInfo elements of static-specifying type definition 210. The annotation and appinfo are elements normally reserved for application-level documentation of the type or element in which they are contained.

According to the present implementation, action 306 includes specifying one or more attributes of static data instances. Such attributes of each static data instance may include allowoverride and propagate attributes as described above.

Figure 4:
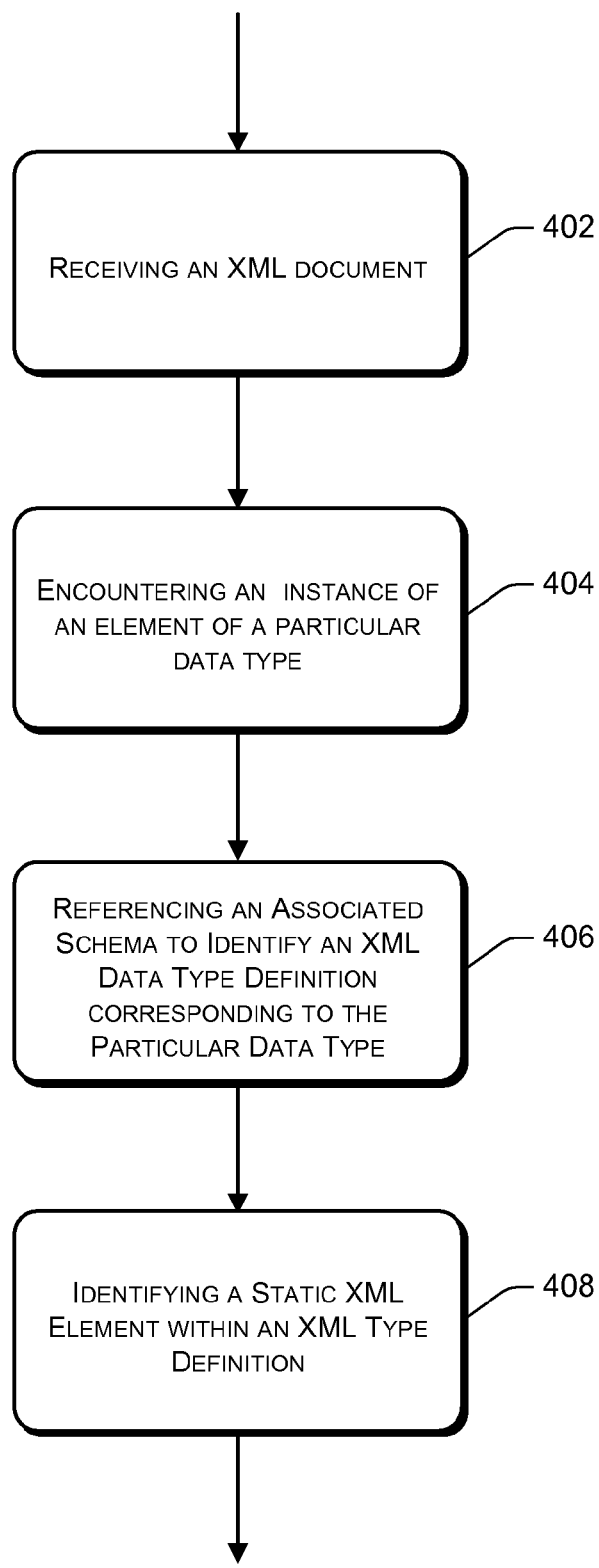
FIG. 4 illustrates an exemplary method of processing an XML document to utilize static data in the XML environment of FIG. 2.

FIG. 4 illustrates further techniques used in processing or consuming an XML document having one or more XML elements. These steps or actions will be described with reference to the components of FIG. 2.

Action 402 comprises receiving XML document 204 for processing. Action 404 comprises interpreting XML document 204 and in that process encountering an instance of an element of a particular data type. Action 406 comprises referencing an associated schema to identify the XML data element and type definitions corresponding to the encountered instance.

Action 408 comprises identifying an instance of an XML element of previously-agreed upon data type, such as the StaticInfo data type, within static-specifying type definition 210. This instance contains instances of elements that are to be statically associated with instances found in XML document 204 of the data type defined by static-specifying type definition 210.

In the illustrated embodiment, action 408 includes extracting XML instances of element(s) representing static data from a well-known or standardized location within static-specifying type definition 210. Such a location may be within the annotation and appinfo elements of static-specifying type definition 210. More generally, the location might be any portion of static-specifying data type definition 210 reserved for documentation, or any other standardized location.

In the described embodiment, action 408 includes identifying attributes associated with the static data. Such attributes are part of the StaticInfo element described above, and include the allowoverride and propagate attributes as already described.

Figure 5:
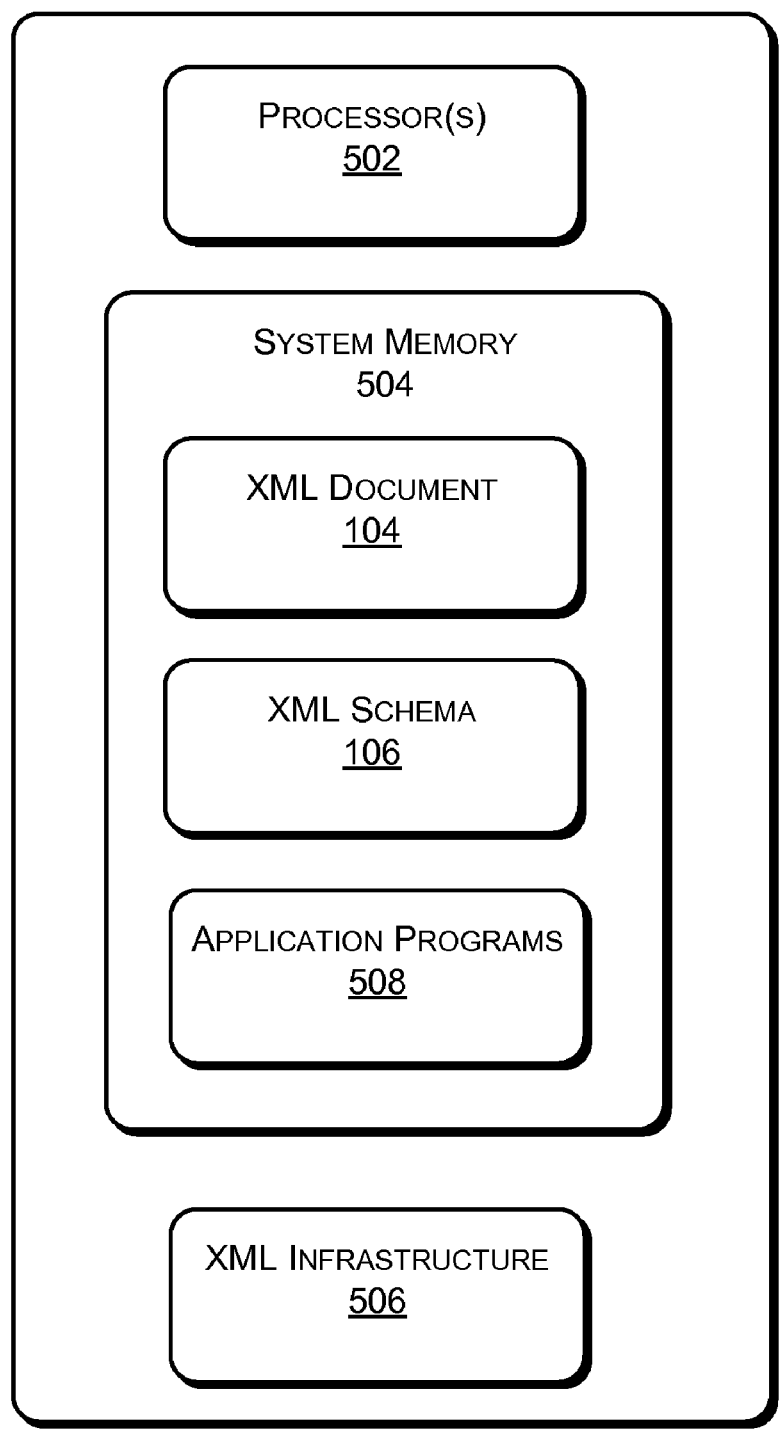
FIG. 5 illustrates a system capable of implementing the techniques described herein.

FIG. 5 illustrates a system 500 capable of implementing the techniques described above. In many instances, system 500 will comprise a personal computer of some sort.

In this example, system 500 includes processor(s) 502, memory 504, an XML infrastructure 506 and application programs 508. Processor(s) 502 may be one or more microprocessors, microcomputers, microcontrollers, dual core processors, and so forth. Memory 504 might include, for example, volatile random access memory (e.g., RAM) and non-volatile read-only memory (e.g., ROM, flash memory, etc.), removable and non-removable magnetic or optical media, etc. Such memory contains programs and instructions to perform the steps and actions described herein, and may also include the XML documents 104/204 and schemas 106/202 described herein.

XML infrastructure 506 typically comprises an operating system service that aids other programs in parsing and validating XML structures.

Conclusion

Although specific implementations have been described in language specific to structural and functional features, the appended claims are not necessarily limited to such described features. Rather, such described features and methods are disclosed as exemplary implementations for specifying static data in XML environments.

The invention claimed is:

1. A method of associating static data with one or more instances of XML elements of a desired data type, the method comprising:

defining the desired data type as static data with a static-specifying data type definition in an XML schema, the static-specifying data type definition including:
a first attribute identifying overridden data in an XML document when the static data is sub-typed,
a second attribute specifying whether the static data is propagated in the XML document, and
a third attribute specifying whether the static data is overridden when the static data is sub-typed;
embedding an instance of an XML element of a pre-defined data type within annotation and appinfo elements of the static-specifying data type definition, the embedded XML instance representing the static data, and the static data of the instance of the XML element of the pre-defined data type applying to any other instances of elements of a data type including the static-specifying data type definition; and
referencing the XML schema to obtain, from one XML document, the static data associated with the one or more XML instances of elements of the desired data type.

2. A method as recited in claim 1, further comprising: placing the embedded XML instance representing the static data in a standardized location within the static-specifying data type definition.

3. One or more computer-readable memories containing XML data, wherein the one or more computer-readable memories does not include signals, such XML data comprising:

one or more XML schemas;
a static-value data type definition within the one or more XML schemas;
a static-specifying data type definition within the one or more XML schemas, the static-specifying type definition including:
a first attribute indicating an address of a file associated with the static data, and
a second attribute identifying overridden data in an XML document when the static data is sub-typed;
an instance of an element of the static-value data type embedded within the static-specifying data type definition, static data of the embedded instance applying to any other instances of elements of a data type including the static-specifying data type definition; and
an XML document having an instance of an element of the static-specifying data type definition, the static data being obtained by referencing the one or more XML schemas.

4. The one or more computer-readable memories as recited in claim 3, wherein the instance of the element of the static-value data type is placed in a standardized location within the static-specifying data type definition.

5. The one or more computer-readable memories as recited in claim 3, wherein the instance of the static-value data element is placed within the annotation and appinfo elements of the static-specifying type definition.

6. The one or more computer-readable memories as recited in claim 3, wherein the instance of the static-value data element is placed in a portion of the static-specifying type definition reserved for documentation.

7. A method of processing an XML document having one or more instances of an XML element of a particular data type, the method comprising:

identifying an XML static-specifying type definition corresponding to the particular data type;
identifying an instance in the static-specifying type definition of a static-value element that represents static data;
identifying attributes of the static data within the static-specifying type definition, the attributes:
identifying overridden data in an XML document when the static data is sub-typed, and
specifying whether the static data is propagated in the XML document, and whether the static data is overridden when the static data is sub-typed;
associating the one or more instances of the XML element with the static data such that the static data apply to any other instances of a data type including the static-specifying data type definition; and
referencing an XML schema to identify the instance.

8. A method as recited in claim 7, further comprising: identifying the instance from within a standardized location of the static-specifying type definition.

9. A method as recited in claim 7, further comprising: identifying the instance from within annotation and appinfo elements of the static-specifying data type definition.

10. A method as recited in claim 7, further comprising: identifying the instance from a portion of the static-specifying type definition reserved for documentation.

11. A method as recited in claim 7, further comprising: identifying the instance from within an instance of an element that has been previously agreed upon to contain static data.

* * * * *